3,340,267
CERTAIN N-(ETHOXYCARBONYL)-NORTRO-
PANE AND 9 - AZABICYCLO[3.3.1]NONANE
DERIVATIVES
Ernst Jucker, Ettingen, and Adolf Lindenmann,
Basel, Switzerland, assignors to Sandoz Ltd.,
Basel, Switzerland
No Drawing. Filed July 27, 1965, Ser. No. 475,283
Claims priority, application Switzerland, Aug. 5, 1964,
10,203/64
4 Claims. (Cl. 260—292)

ABSTRACT OF THE DISCLOSURE

Compounds of the formula

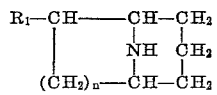

useful as intermediates for antidiabetics and diuretics are obtained by acid hydrolysis of the corresponding

derivatives to split off e.g. the ethoxycarbonyl radical attached to the piperidine nitrogen atom, $R_1$ being hydrogen or lower alkoxy, $R_2$ being ($C_1$-$C_6$) alkyl or ($C_7$-$C_{12}$) aralkyl and $n$ being 1 or 2.

---

The present invention relates to heterocyclic compounds and a process for their production.

The present invention provides a process for the production of heterocyclic compounds of Formula I,

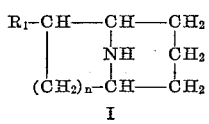

in which $R_1$ signifies a hydrogen atom or a lower alkoxy radical, and
$n$ is 1 or 2, and their acid addition salts, characterized in that a compound of Formula IV,

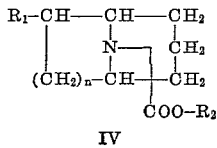

in which $R_2$ signifies an alkyl ($C_1$-$C_6$) or aralkyl ($C_7$-$C_{12}$) radical, and
$R_1$ and $n$ have the above significance, is subjected to acid hydrolysis and, when an acid addition salt is required, the resulting compound is reacted with an organic or inorganic acid. The compounds of Formula IV may be obtained in that a compound of Formula II,

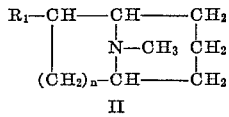

in which $R_1$ and $n$ have the above significance, is heated with a chloroformic acid ester of Formula III,

in which $R_2$ has the above meaning.

The compounds of Formula IV and their acid addition salts (which may be obtained by reaction with an organic or inorganic acid, e.g. those exemplified hereinafter) are novel and form part of the present invention.

Examples of acids for acid addition salt formation with compounds I are: hydrochloric, hydrobromic, sulphuric, fumaric, maleic, tartaric, methanesulphonic, hexahydrobenzoic and p-toluenesulphonic acid.

Until our discovery of the process of the invention the following methods were used for the production of compounds I on an industrial scale:

(a) Ammonium chloride and acetonedicarboxylic acid are condensed with succinic dialdehyde, glutaric dialdehyde or 2-methoxy-succinic dialdehyde in the presence of sodium carbonate and the resulting bicyclic ketone of Formula V,

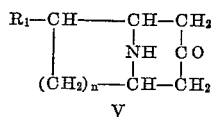

in which $R_1$ and $n$ have the above significance, is reduced with hydrazine hydrate.

(b) A ketone of Formula VI,

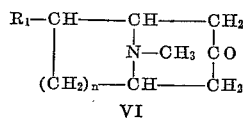

in which $R_1$ and $n$ have the above significance, is reduced with hydrazine hydrate and the resulting compound II is subsequently oxidized with potassium permanganate or potassium ferricyanide. The ketone IV is obtained by condensing acetonedicarboxylic acid and the corresponding dialdehyde in a manner analogous to that described in (a) above, but using methylamine in place of ammonium chloride.

(c) Tropine or N-methylgranatoline (9-methyl-9-azabicyclo[3,3,1]nonan-3-ol), obtained by reduction of the corresponding ketones, is heated with hydrogen iodide and red phosphorus to approximately 260° C. in a closed tube.

The methods (a), (b) and (c) have been found to be unsatisfactory for an industrial scale process, since the individual stages of the processes give poor yields and/or non-uniform products:

In method (a) the condensation of ammonium chloride and acetonedicarboxylic acid with the corresponding dialdehyde gives a yield of at most 10 to 27% of ketone V (compare Danish Patent No. 87,485), while the subsequent reduction gives a maximum yield of 40 to 45%.

In the case of method (b) the starting material (VI) is often obtained with a yield of approximately 80% and the subsequent reduction gives compound II with a yield of 80 to 90%, but this method is not suitable for technical use, as the last stage of the process (II→I: oxidative spliting off of the methyl radical on the nitrogen atom with potassium permanganate or potassium ferricyanide) gives only very poor yields of the final product I.

Process (c) is not suitable at all for use on an industrial scale due to the non-uniform reaction products and the very poor yields of pure end products.

Compound I, e.g. nortropane (8-azabicyclo[3,2,1]octane), its methoxy derivative and 9-azabicyclo[3,3,1]nonane are valuable intermediates which may be used for the production of important antidiabetics and diuretics for oral administration, e.g. $N^1$-[nortropanyl-(8)]-$N^2$-(p-chlorobenzene-sulphonyl)-urea which may be obtained as described in our patent application No. 423,861.

It has now surprisingly been found that, as is the case in the process of the present invention, when the methyl radical attached to the nitrogen atom in compounds II is replaced by hydrogen, compounds I can be obtained in excellent yields via the intermediate product IV. Thus yields as high as 82 to 97% can be obtained in the two stages of the process by proceeding as in the examples given hereinafter. This result was the more surprising as it was hitherto not possible to split off an ethoxycarbonyl radical attached to the piperidine nitrogen atom by heating with concentrated hydrochloric acid or with concentrated caustic potash solution [see Chem. Ber. Bd. 15, page 425 (1882)], so that further efforts to achieve this result were considered to be likely to lead to failure and hence there was a long standing prejudice against any further experiments involving a similar reaction.

One method of carrying out the process of the present invention is as follows: A solution of compound II in an absolute organic solvent, e.g. benzene or toluene, is added dropwise to a chloroformic acid ester, e.g. chloroformic acid ethyl ester, dissolved in more of the same solvent, while slightly heating during the course of approximately half an hour. The mixture is then heated to the boil at reflux for about 2 to 3 hours to complete the reaction. The cooled solution is then washed first with a dilute inorganic acid and then with water. The compound IV obtained as intermediate is isolated in manner known per se and purified by distillation at reduced pressure. In the next stage of the process the ethoxycarbonyl radical is split off in the presence of a halogen hydracid. This is effected in that the compound IV dissolved in aqueous hydrochloric or hydrobromic acid is heated at reflux for about 3 to 35 hours.

Compounds of Formula I, in which $R_1$=H, are isolated from the reaction mixture and purified as follows: After removing the hydrochloric acid at a slightly reduced pressure the residue is taken up two to three times in a low molecular weight alkanol (i.e. containing from 1 to 6 carbon atoms inclusive), the solvent being removed each time in a vacuum; for further purification the residue is dissolved in a boiling lower alkanol and the solution is optionally filtered over animal charcoal. After cooling the filtrate the final product crystallizes in the form of the hydrochloride or hydrobromide and may be converted in manner known per se into the free base or into another suitable salt.

Compounds of Formula I, in which $R_1$ signifies a lower alkoxy radical, may be isolated from the reaction mixture as follows: When concentrated hydrochloric acid has been used for the splitting off of the alkoxycarbonyl radical, the hydrochloric acid reaction solution, which has been washed with ether, is treated with a caustic alkali solution and the resulting alkaline solution is subsequently saturated with potassium carbonate. When hydrochloric acid or hydrobromic acid weaker than the concentrated acid has been used, it is advantageous to evaporate the reaction solution to dryness and then make the aqueous solution of the residue alkaline with a caustic alkali solution. The end product is then extracted with an inert organic solvent, e.g. chloroform, benzene, methylene chloride or toluene. After evaporating the solvent the crude end product is purified by distillation and optionally converted into a suitable salt.

In the following non-limitative examples all temperatures are indicated in degrees centigrade and are uncorrected. The process as exemplified provides an inexpensive method of producing the compounds of Formula I, giving good yields in the individual stages thereof; it is especially suitable for use on a technical scale.

EXAMPLE 1

*Nortropane (8-azabicyclo[3,2,1]octane)*

(a) *N-(ethoxycarbonyl)-nortropane.*—A solution of 142 g. of tropane in 500 cc. of absolute benzene is added dropwise at 70° to a solution of 382 g. of chloroformic acid ethyl ester in 1000 cc. of absolute benzene whilst stirring during the course of 30 minutes, whereby a strong gas evolution occurs. The colourless reaction solution is subsequently heated at reflux for a further 2 hours. After cooling the benzene solution is washed with a total of 450 cc. of an aqueous 2 N hydrochloric acid and then with a total of 270 cc. of water. After drying the benzene solution over magnesium sulphate the solvent is evaporated at 15 mm. of Hg and the residue is distilled, whereby N-(ethoxycarbonyl)-nortropane distills over between 122–124° and 13 mm. of Hg in the form of a colourless oil. Yield 90–95%.

(b) *Nortropane (8-azabicyclo[3,2,1]octane).*—189 g. of N-(ethoxycarbonyl)-nortropane are dissolved in 756 cc. of concentrated hydrochloric acid, whereby the solution heats itself slightly (approximately 40°). The resulting faintly reddish solution is subsequently heated at reflux for 15 to 17 hours (oil bath temperature: 110°). The bath temperature is then raised to 130° and the hydrochloric acid is distilled off at slightly reduced pressure. The dark, highly viscous residue is dissolved three times, each time in 200 cc. of absolute ethanol and the solvent is evaporated each time at 15 mm. of Hg. The grayish brown, partially solid mash is then dissolved in 400 cc. of boiling ethanol and the solution is filtered over animal charcoal. The filtrate is cooled to approximately 10°, whereby nortropane hydrochloride precipitates in crystalline form. Further portions of nortropane hydrochloride may be obtained by further reducing the volume of the mother liquor and by adding ether. Melting point 307–309° (sintering at 306°) after drying in a high vacuum at 100°. Yield 94–97%.

Picrate: Melting point 210–212° from ethanol. Base: boiling point 160–162°.

EXAMPLE 2

*Nortropane*

The splitting off of the ethoxycarbonyl radical from N-(ethoxycarbonyl)-nortropane may be effected with an acid of a lesser concentration than concentrated hydrochloric acid (compare Example 1b). This is effected as follows: 91.6 g. of N-(ethoxycarbonyl)-nortropane are added dropwise to a solution of 80 cc. of water and 170 cc. of concentrated hydrochloric acid during the course of 20 minutes, whereby a strong gas evolution occurs. The reaction solution is then heated at reflux for 15 hours at an oil bath temperature of 125° and the hydrochloric acid is subsequently distilled off at slightly reduced pressure. Working up of the highly viscous residue is effected in a manner analogous to that described in Example 1b. Nortropane hydrochloride melts at 307–309° (sintering at 306°) after drying in a high vacuum at 100°. Yield 91.7%.

EXAMPLE 3

*Granatanine (9-azabicyclo[3,3,1]nonane)*

(a) *9-(ethoxycarbonyl) - 9-azabicyclo[3,3,1]nonane.*—A solution of 30.0 g. of 9-methyl-9-azabicyclo[3,3,1]nonane in 130 cc. of absolute benzene is added dropwise whilst stirring at 70° to a solution of 70 g. of chloroformic acid ethyl ester in 260 cc. of absolute benzene during the course of half an hour, whereby a strong gas evolution occurs. The reaction solution is subsequently heated at reflux for a further 2 hours. After cooling the benzene solution is washed with a total of 100 cc. of aqueous 2 N hydrochloric acid and then with a total of 60 cc. of water. After drying the benzene solution over magnesium sulphate the solvent is evaporated at 15 mm.

of Hg and the residue is distilled in a vacuum, whereby 9-(ethoxycarbonyl) - 9-azabicyclo[3,3,1]nonane distills over between 132–133° and 10 mm. of Hg in the form of a colourless oil and crystallizes in the receptacle. Yield 88–95%.

(b) *Granatanine (9-azabicyclo[3,3,1]nonane).*—A mixture of 34.0 g. of 9-(ethoxycarbonyl)-9-azabicyclo [3,3,1]nonane and 200 cc. of concentrated hydrochloric acid is heated at reflux for 35 hours (oil bath temperature 120°), whereby a homogeneous solution results. The bath temperature is then raised to 130° and the hydrochloric acid is distilled off at slightly reduced pressure. The gray, pappy residue is dissolved three times, each time in 80 cc. of absolute ethanol and each time the solvent is evaporated in a vacuum. The powdery residue is dissolved in methanol whilst heating, the solution is filtered over animal charcoal and cooled to room temperature. After the addition of ether 9-azabicyclo[3,3,1] nonane hydrochloride crystallizes. Melting point 322–326° (decomposition). Yield 85–95%. Base: boiling point 85–87°/25 mm. of Hg.

EXAMPLE 4

*Granatanine*

The splitting off of the ethoxycarbonyl radical may likewise be effected with an acid of a lesser concentration than concentrated hydrochloric acid (compare Example 3*b*) as follows:

25.45 g. of 9-(ethoxycarbonyl)-9-azabicyclo[3,3,1]nonane are melted and added to 105 cc. of a 47% aqueous hydrobromic acid solution. After heating at reflux for 3 hours the clear solution is evaporated. The residue is then dissolved twice, each time in 12.5 cc. of ethanol, each time the solvent is evaporated and the resulting residue is heated to 40–45° in 25 cc. of acetone whilst stirring. After cooling the hydrobromide crystallizes and is dried for 6 hours at 100°/14 mm. of Hg. Melting point 320° (decomposition). Yield 82%.

EXAMPLE 5

*6β-methoxy-nortropane (6β-methoxy-8-azabicyclo [3,2,1]octane)*

(a) *6β-methoxy - N-(ethoxycarbonyl) - nortropane.*—This compound is obtained by reacting 13.4 g. of 6β-methoxy-tropane with 28.2 g. of chloroformic acid ethyl ester in a manner analogous to that described in Example 1*a*. The compound distills at 146–148° and a pressure of 16 mm. of Hg in the form of a colourless oil. Yield 82%.

(b) *6β-methoxy-nortropane (6β-methoxy-8-azabicyclo [3,2,1]octane).*—A mixture of 8.3 g. of 6β-methoxy-N-(ethoxy-carbonyl)-nortropane and 35 cc. of concentrated hydrochloric acid is heated to 90° for 15 hours whilst stirring. The cooled hydrochloric acid reaction solution is then washed with ether, the aqueous solution is made alkaline with concentrated sodium hydroxide solution (pH approximately 11), is saturated with solid potassium carbonate and extracted with chloroform. The chloroform solution is subsequently dried over magnesium sulphate, the solvent is evaporated and the residue is distilled in a vacuum, whereby 6β-methoxy-nortropane distils over at 109–111° and a pressure of 40 mm. of Hg in the form of a colourless oil. Yield 85%.

Picrate: Melting point 214–216° from ethanol.

EXAMPLE 6

*6β-methoxy-nortropane*

The splitting off of the ethoxycarbonyl radical may be effected with an acid of a lesser concentration than concentrated hydrochloric acid (compare Example 5*b*). This is effected as follows:

(a) 15.7 g. of 6β-methoxy-N-(ethoxycarbonyl)-nortropane are added dropwise at 95° whilst stirring during the course of 20 minutes to a solution of 13 cc. of water and 30 cc. of concentrated hydrochloric acid. After heating at reflux for 12 hours the reaction solution is evaporated to dryness in a vacuum. The residue is then taken up in water, the aqueous solution is made alkaline with concentrated sodium hydroxide solution whilst cooling and extraction is effected several times with chloroform. After drying the combined chloroform extracts over magnesium sulphate the chloroform is evaporated in a vacuum and the oily residue is fractionated in a vacuum, whereby 6β-methoxy-nortropane distills over between 109–111° and a pressure of 40 mm. of Hg in the form of a colourless oil. Yield 85–90%.

(b) A mixture of 15.7 g. of 6β-methoxy-N-(ethoxycarbonyl)-nortropane and 65 cc. of aqueous 47% hydrobromic acid solution is heated to 110° whilst stirring for 3 hours. Evaporation to dryness is then effected in a vacuum. The residue is taken up in water, the aqueous solution is made alkaline with concentrated sodium hydroxide solution whilst cooling and extraction is effected several times with chloroform. After drying the combined chloroform extracts over magnesium sulphate the chloroform is evaporated in a vacuum and the residue is fractionated in a vacuum, whereby 6β-methoxy-nortropane distills over at 109–111° and a pressure of 40 mm. of Hg in the form of a colourless oil. Yield 82–85%.

What is claimed is:
1. A compound of the formula:

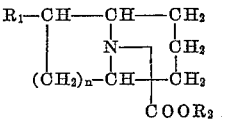

in which
  $R_1$ is hydrogen or lower alkoxy,
  $R_2$ is alkyl of 1 to 6 carbon atoms or aralkyl of 7 to 12 carbon atoms and
  $n$ is 1 or 2.
and their acid addition salts.
2. N-(ethoxycarbonyl)-nortropane.
3. 9-(ethoxycarbonyl)-9-azabicyclo[3,3,1]nonane.
4. 6β-methoxy-N-(ethoxycarbonyl)-nortropane.

References Cited

UNITED STATES PATENTS 2,962,499  11/1960  Weiner et al. _____ 260—292

OTHER REFERENCES

Fieser et al.: Advanced Organic Chemistry, Reinhold (1961), pages 373, 374, 393, 720.

WALTER A. MODANCE, *Primary Examiner.*

A. L. ROTMAN, *Assistant Examiner.*